Figure 1:
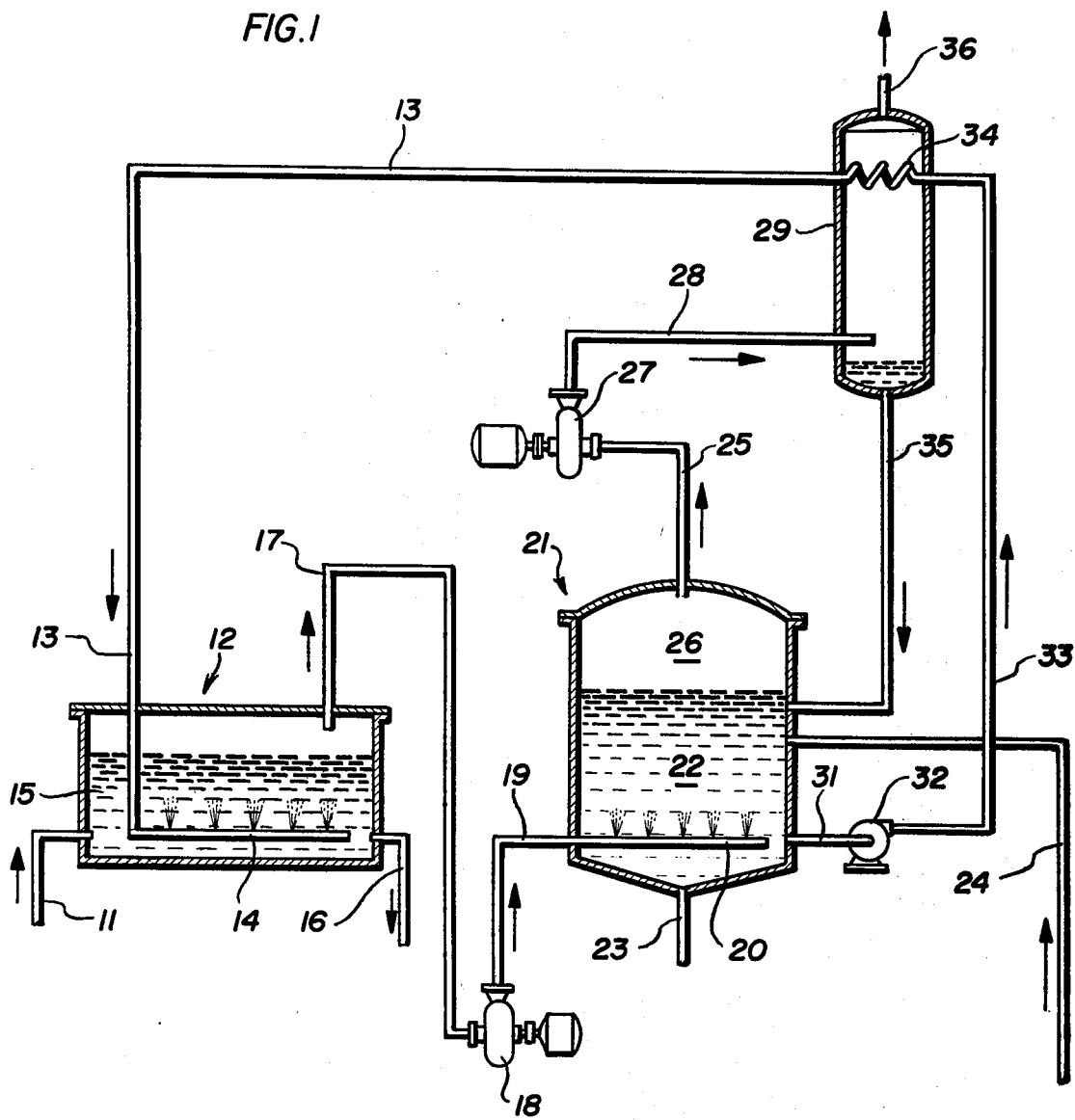

United States Patent [19]
Lange et al.

[11] 3,909,409
[45] Sept. 30, 1975

[54] RECOVERY SYSTEM FOR OXYGEN FROM WASTE WATER OXYGENATION

[75] Inventors: Kenneth Wilson Lange, Burr Ridge; James Bernard Maher, Oak Brook, both of Ill.

[73] Assignee: Chicago Bridge & Iron Company, Oak Brook, Ill.

[22] Filed: June 12, 1974

[21] Appl. No.: 478,504

[52] U.S. Cl. .................. 210/60; 210/63; 210/71; 62/10; 62/12; 62/58
[51] Int. Cl.² .................................. C02B 1/34
[58] Field of Search ............. 210/7, 12, 15, 63, 2–4, 210/194, 195, 175, 180, 181, 182, 60, 71; 62/10, 11, 12, 13, 23, 24, 27, 28, 29, 31, 32, 34, 42–44, 54, 58

[56] References Cited
UNITED STATES PATENTS

| | | | |
|---|---|---|---|
| 2,519,892 | 8/1950 | Dennis | 62/12 |
| 2,597,385 | 5/1952 | Schilling | 62/12 |
| 3,034,306 | 5/1962 | Schuftan et al. | 62/43 |
| 3,324,668 | 6/1967 | Lohrenz et al. | 62/12 |
| 3,547,811 | 12/1970 | McWhirter | 210/220 |
| 3,660,277 | 5/1972 | McWhirter et al. | 210/15 |
| 3,772,187 | 11/1973 | Othmer | 210/7 |

*Primary Examiner*—Thomas G. Wyse
*Assistant Examiner*—Benoit Castel
*Attorney, Agent, or Firm*—Merriam, Marshall, Shapiro & Klose

[57] ABSTRACT

The method of introducing substantially pure gaseous oxygen through waste water, having a high biochemical oxygen demand (BOD), in an enclosed receptacle, separating an effluent stream of gas containing oxygen mixed with nitrogen, carbon dioxide, water vapor, and other gases present in trace quantities, from the oxygenated waste water, feeding the effluent stream of gas into a pool of liquid oxygen in an enclosed receptacle and thereby solidifying carbon dioxide and water vapor, separating a stream of gas containing oxygen, nitrogen, and other gases present in trace quantities, from the liquid oxygen, cooling the gas stream to a temperature low enough to condense the oxygen, but not the nitrogen, in the said gas stream, returning the liquefied oxygen to the pool of liquid oxygen and venting the remaining gas to a disposal means, and vaporizing liquid oxygen from the pool and delivering the pure oxygen gas to the waste water in the enclosed receptacle.

5 Claims, 2 Drawing Figures

RECOVERY SYSTEM FOR OXYGEN FROM WASTE WATER OXYGENATION

This invention relates to a method of, and apparatus for, treating water exhibiting a biochemical oxygen demand by oxygenation.

Waste water from municipal sewage, chemical wastes from petrochemical or paper plants or fermentation of liquor, or waste water from other sources, contains organic impurities on which aerobic bacteria feed and grow and beneficially consume or convert the impurities. The oxygen required by these beneficial bacteria to metabolize the organic impurities generally is expressed as "biochemical oxygen demand" or BOD in the waste water. The controlled growth of the bacteria results in the formation of a biological culture or sludge that can be settled from the water. In this way, a clarified effluent of water is produced which can be further treated or disposed of by discharge to a holding pond, stream or lake.

It is, and has been, common practice in the past to sustain the aerobic bacteria by supplying oxygen in the form of air to the waste water. The general welfare and rate of growth of the microbiological population, and therefore, the rate at which the microorganisms are able to metabolize or consume the organic impurities in the waste water, is influenced or limited by the level of dissolved oxygen in the waste water. The dissolved oxygen level in a waste water exposed to, and supplied with, atmospheric air is, in turn, limited by the well known concepts of vapor-liquid equilibria as controlled by the partial pressures of the various constituents of the atmospheric air. In fact, the equilibrium dissolved-oxygen concentration in the waste water is a direct function of the partial pressure of oxygen in the gas to which the waste water is exposed. To exploit this principle, improved processes have been developed which utilize an oxygen-enriched media, or substantially pure oxygen, as the source of oxygen to sustain the aerobic bacteria suspended in the waste water. A number of ways have been developed for introducing an oxygen-enriched media, or pure oxygen, to waste water to promote growth of bacteria. For example, see U.S. Pat. Nos. 3,547,811 and 3,607,735.

While the oxygen-enriched media, or pure oxygen, increase the growth rate of bacteria and facilitate the rate of biological sludge formation, only a part of the oxygen in the feed is consumed in the process. An effluent gas, rich in oxygen, results. Venting of this gas to the atmosphere constitutes an economic waste. The effluent gas stream, however, cannot be directly recycled because it is diluted by nitrogen, which is inherently present when the waste water is supplied to the digestion tank or basin or other receptacle where the aerobic bacteria metabolize the impurities in the waste water. In addition, the effluent gas contains an excessive amount of carbon dioxide which is produced by biological metabolism. Unless the carbon dioxide is removed, the effluent gas would suppress growth of the bacteria if it were recycled to a waste water being treated by oxygenation. There is, accordingly, a need for a method and apparatus which can be used for purifying the oxygen rich gas effluent from the biological oxidation of waste water so that it can be used again in the oxygenation process.

According to the present invention there is provided an improved process of, and apparatus for, purifying the oxygen rich effluent gas from a biological oxidation process, applied to waste water, which uses an oxygen-enriched media, or pure oxygen, formed wholly or in part from a source or pool of liquid oxygen. The effluent gas stream is sparged into a pool of stored liquid oxygen. Because of the low storage temperature of the liquid oxygen, the carbon dioxide and water vapor contained in the effluent gas is transformed to a solid by cooling and subsequent freezing by direct contact with the liquid oxygen. The solid carbon dioxide and ice settle to the bottom of the pool of liquid oxygen. Periodically, or continuously, the accumulated solids are withdrawn and discarded. Following removal of the carbon dioxide and water vapor, the remaining effluent gas is primarily oxygen mixed with nitrogen, although some other gases, such as argon, in trace quantities, also may be present. The remaining gas mixture is further cooled to a temperature sufficiently low to liquefy the oxygen in the gas. This cooling can be readily effected by passing the gas mixture in direct or indirect heat exchange with liquid oxygen. The temperature of the gas mixture is not lowered to the boiling point of nitrogen. Thus, the oxygen in the admixture is liquefied while the nitrogen, and other gases, remain in the gaseous state. The liquid oxygen is separated from the gas mixture and returned to the liquid oxygen pool for storage until it is needed. The waste gases are disposed of by any suitable means such as by venting to the atmosphere.

The invention not only includes the described method of recovering oxygen from the effluent gas but, in addition, it provides novel apparatus particularly suitable for use in practicing the process aspects of the invention.

Figure 2:
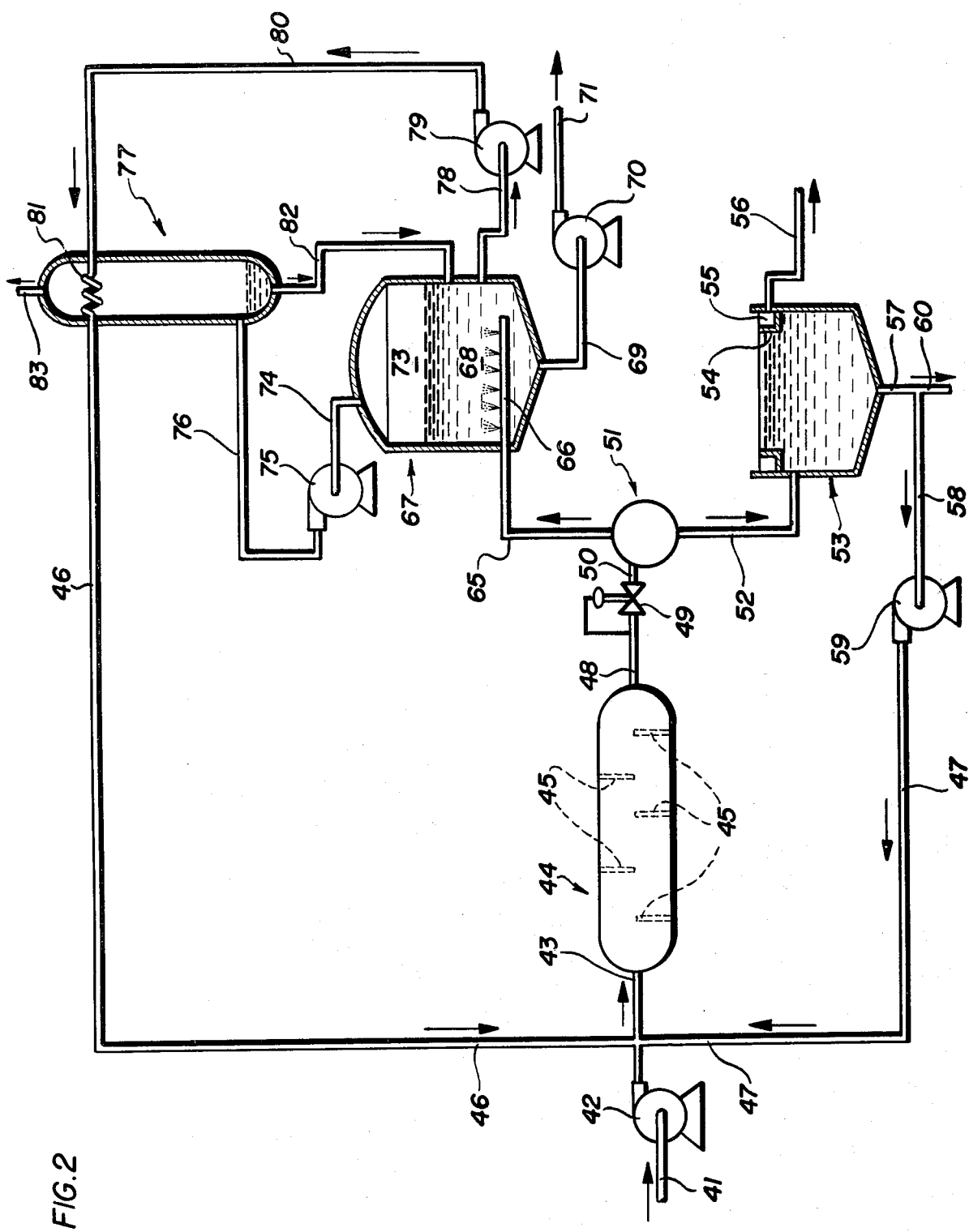

The invention will be described further in conjunction with the attached drawings, in which:

FIG. 1 is a schematic representation of one embodiment of apparatus which can be used in practicing the invention; and FIG. 2 is a schematic representation of a second embodiment of apparatus which can be used in practicing the invention but in which the oxygenation receptacle is designed to effect the oxygenation under increased pressure.

With reference to FIG. 1, waste water from a sanitary sewer, or other source, is fed by conduit 11 to waste water receptacle 12 where the organic impurities are digested by aerobic bacteria. Conduit 13 conveys an oxygen-enriched media, or pure oxygen, to sparger 14 positioned in the lower part of receptacle 12 beneath the level of waste water 15 therein. Conduit 16 is used to remove the combined waste water and biological microorganisms from receptacle 12. Effluent gas containing oxygen, nitrogen, carbon dioxide, water vapor and traces of other gases is removed from waste water receptacle 12 by means of conduit 17. Compressor 18 delivers the effluent gas under pressure to conduit 19. Conduit 19 communicates with sparger 20 positioned in the lower part of liquid oxygen storage tank 21. Conduit 24 communicates with the interior of oxygen storage tank 21 and is used to supply make-up liquid oxygen thereto. Tank 21 is suitably insulated to retard heat leak. A pool of liquid oxygen 22 is maintained in tank 21. As the effluent gas is bubbled from sparger 20, which is positioned below the liquid oxygen level, it is cooled to a temperature which causes the carbon dioxide and water vapor to solidify. The resulting solids settle to the bottom of tank 21 and are withdrawn therefrom continuously or periodically by means of conduit 23.

Conduit 25 is used to remove the oxygen admixed with nitrogen and traces of other gases from the vapor space 26 of liquid oxygen storage tank 21 to compressor 27. Compressor 27 forces the gas mixture under pressure to conduit 28 which conveys it into the lower part of nitrogen stripper vessel 29. Liquid oxygen is removed from liquid oxygen storage tank 21 by means of conduit 31 which delivers it to pump 32. Pump 32 forces the liquid oxygen under pressure to conduit 33 which delivers it to heat exchanger 34 positioned in the upper space of nitrogen stripper vessel 29. As the gas mixture supplied by conduit 28 flows vertically upward through stripper vessel 29, it is further cooled and the gaseous oxygen contained therein is transformed into liquid oxygen by direct contact heat exchange with liquid oxygen contained in stripper 29 and by indirect heat exchange with liquid oxygen passing through heat exchanger 34. As a result, the oxygen is separated from the nitrogen gas. The so-formed liquid oxygen drops to the lower part of nitrogen stripper vessel 29. It is conveyed from stripper 29 by conduit 35 to liquid oxygen storage tank 21. Nitrogen and other gases, present in trace quantities, essentially free of oxygen, are vented from nitrogen stripper vessel 29 by conduit 36.

The liquid oxygen passed through the inside of heat exchanger 34 is largely, if not completely, vaporized. The resulting oxygen gas is delivered from heat exchanger 34 to conduit 13 which, in turn, conveys it to sparger 14 located in the lower space of waste water receptacle 12.

Waste water receptacle 12 is designed to prevent significant ingress of atmospheric air into the receptacle so that the gas content therein can be readily controlled and the oxygen concentration not be diluted by air.

The described process utilizes the inherent, stored refrigeration in the liquid oxygen to solidify the carbon dioxide and water vapor and to liquefy the oxygen in the effluent gas to thereby separate the oxygen from the remaining gases, which is predominantly nitrogen. The heat so extracted is approximately equivalent to the heat required to vaporize the quantity of liquid oxygen which is normally required in the waste water oxygenation receptacle 12. Thus, there is normally no added refrigeration cost required in practicing the purification process provided by this invention. Furthermore, relatively simple apparatus and equipment can be used, thus minimizing the amount of capital investment and servicing which would be required in practicing the invention.

FIG. 2 illustrates a second embodiment of the invention. Waste water containing organic impurities is fed by conduit 41 to pump 42 which forces it under pressure through conduit 43 into receptacle 44 which is designed to operate at an elevated pressure, such as a minimum of 30 psig. Receptacle 44 is an elongated, horizontal, circular cylinder with hemispherical ends. Static mixing baffles 45 are positioned along and transverse to the axis of receptacle 44. Pure oxygen is fed by conduit 46 to conduit 43 for admixture with the waste water. In a similar manner, recycled biological sludge is fed by conduit 47 to conduit 43 for mixture with the waste water and oxygen. The waste water in receptacle 44 is saturated with oxygen at the elevated operating pressure to provide 20 to 30% more oxygen than required for biological conversion of the organic impurities in the waste water to additional sludge, carbon dioxide and additional water. This permits the retention time of the waste water in the receptacle to be reduced to a shorter period, such as 15 to 30 minutes. The short retention time renders the use of a pressure receptacle 44 economically competitive with conventional covered rectangular or circular tanks or basins which use associated mixers and recirculation blowers to feed an oxygen-enriched media or pure oxygen to the waste water therein. Operation at elevated pressure with an enriched or pure oxygen media allows a higher dissolved oxygen concenentration to be maintained in the waste water in vessel 44. The short retention time is effective in biologically metabolizing the organic impurities in the waste water because the aerobic bacteria thrive and operate far more efficiently at the higher dissolved oxygen concentration.

The treated waste water and biological sludge removed from receptacle 44 by conduit 48 pass through pressure control valve 49 to conduit 50 which delivers them to separating tank 51. The water and sludge settle to the lower part of separating tank 51 and are removed therefrom by conduit 52 to a clarifying basin 53. Clarified water overflows weir 54 into trough 55 in basin 53 from which it is removed by conduit 56 for suitable disposal. The biological sludge settles in tank 53 and is removed therefrom by conduit 57. A portion of the sludge is fed by conduit 57 to conduit 58 which delivers it to pump 59. Pump 59 conveys it to conduit 47 to delivery as recycle sludge to the waste water in conduit 43. The remaining portion of the settled sludge is delivered by conduit 57 to conduit 60 for disposal in a suitable manner.

Effluent gas from the waste water treating receptacle 44 is collected in the vapor space of separating tank 51. The effluent gas containing oxygen, nitrogen, carbon dioxide, water vapor and traces of other gases is removed from the vapor space of separating tank 51 by means of conduit 65 and delivered thereby to sparger 66 positioned in the lower space of liquid oxygen insulated storage vessel 67. The effluent gas bubbles from sparger 66 into liquid oxygen 68 stored at atmospheric pressure. Since the liquid oxygen is at a low temperature, the carbon dioxide and water vapor in the effluent gas are cooled and solidify and settle to the bottom of vessel 67. They are removed from vessel 67 by means of conduit 69 which is in communication with pump 70 which delivers the solids to conduit 71 for disposal.

The oxygen, nitrogen and other gases which do not solidify or condense in the liquid oxygen in storage tank 67 accumulate in the vapor space 73 and are conveyed therefrom by means of conduit 74 to compressor 75 which pressurizes the gases and delivers them by conduit 76 to the lower space of nitrogen stripper vessel 77.

Liquid oxygen is removed by conduit 78 from the lower space of liquid oxygen storage vessel 67 and it is delivered to pump 79 which pressurizes it and feeds it through conduit 80 to heat exchanger 81 located in the upper space of nitrogen stripper vessel 77. As the gas containing oxygen, nitrogen, and other gases, fed by conduit 76, flows vertically upward in nitrogen stripper vessel 77, cooling of the gas occurs which causes the contained oxygen to condense and accumulate in the stripper vessel 77. The liquid oxygen is removed from the bottom of said vessel by conduit 82 and is delivered thereby to the liquid oxygen storage vessel 67. The remaining gas, with essentially all of the oxygen removed, is conveyed from nitrogen stripper vessel 77 by conduit 83 for venting to the atmosphere. The liquid oxygen passed through the inside of heat exchanger 81 is largely, if not completely, vaporized by heat exchange with the effluent gas fed by conduit 76 to vessel 77. The oxygen vapor from heat exchanger 81 is fed to conduit 46 which delivers it to conduit 43 for delivery to receptacle 44.

The system of FIG. 2 can be practiced using the following specific conditions:

| Drawing Line Number | 41 | 52 | 43 | 48 | 65 | 76 | 60 | 47 | 80 | 46 |
|---|---|---|---|---|---|---|---|---|---|---|
| Soluble BOD PPM | 220 | 22 | 163 | 22 | | | 22 | 22 | 0 | 0 |
| Solids PPM | 0 | 5784 | 5700 | 5784 | | | 19940 | 19940 | 0 | 0 |
| Vol. Solids PPM | 0 | 4049 | 4000 | 4049 | | | 14000 | 14000 | 0 | 0 |
| $H_2O$ Wt. % | 99.9991 | 99.9837 | 99.4091 | 99.3970 | 2.9 | | 98.0053 | 98.0053 | 0 | 0 |
| $O_2$ Wt. % | .0002 | .0008 | .0203 | .0062 | 66.1 | 96.611 | .0002 | .0002 | 99.5 | 99.5 |
| $N_2$ Wt. % | .0007 | .0001 | .0006 | .0006 | 4.7 | 3.388 | .0005 | .0005 | .5 | .5 |
| $CO_2$ Wt. % | 0 | .0154 | 0 | .0178 | 26.3 | | 0 | 0 | 0 | 0 |
| Pressure PSIA | 14.7 | 14.7 | 90.0 | 90.0 | 14.1 | 20.0 | 14.7 | 90.0 | 105 | 95 |
| Temp. °F. | 60 | 60 | 60 | 60 | 60 | | 60 | 60 | −300 | 60 |
| D.O.* PPM | 2.0 | 8.0 | 203 | 62 | | | 2.0 | 2.0 | | |
| Flow Gal/Day | 5MM | 7MM | 7MM | 7MM | | | 21M | 2MM | 860 | 1230 |
| Flow Mol/Hr | | | | | 6.0 | 6.6 | | | 10.7 | 15.2 |

*Dissolved oxygen

The foregoing detailed description has been given for clearness of understanding only, and no unnecessary limitations should be understood therefrom, as modifications will be obvious to those skilled in the art.

What is claimed is:

1. The method which comprises:
   introducing substantially pure gaseous oxygen through waste water, having a high biochemical oxygen demand (BOD), in a first enclosed receptacle;
   separating an effluent stream of gas containing oxygen mixed with nitrogen, carbon dioxide, water vapor, and other gases present in trace quantities, from the oxygenated waste water;
   feeding the effluent stream of gas into a pool of liquid oxygen in a second enclosed receptacle and thereby solidifying the carbon dioxide and converting the water vapor to ice;
   separating a gas stream containing oxygen, nitrogen, and other gases present in trace quantities, from the liquid oxygen;
   cooling the gas stream from the liquid oxygen to a temperature low enough to condense the oxygen, but not the nitrogen, in the said gas stream, separating the condensed and liquefied oxygen from the nitrogen gas, returning the liquefied oxygen to the pool of liquid oxygen and venting the remaining gas to a disposal means; and
   vaporizing liquid oxygen from the pool and delivering the pure oxygen gas to the waste water in the first enclosed receptacle.

2. The method of claim 1 in which the solid carbon dioxide and ice are removed from the liquid oxygen pool at least periodically.

3. The method of claim 1 in which the waste water is under a pressure of at least 30 psig when oxygenated.

4. The method of claim 1 in which the stream of gas containing oxygen and nitrogen from the liquid oxygen is cooled by passing it in direct or indirect heat exchange with a stream of cold oxygen from the liquid oxygen pool and the cold oxygen is then warmed and introduced into the waste water.

5. The method of claim 4 in which the stream of cold oxygen fed in indirect heat exchange is liquid.

* * * * *